US011566933B2

(12) United States Patent
Kageyama et al.

(10) Patent No.: US 11,566,933 B2
(45) Date of Patent: Jan. 31, 2023

(54) COMBINATION WEIGHING DEVICE FOR CONTROLLING A CONVEYING UNIT

(71) Applicant: Ishida Co., Ltd., Kyoto (JP)

(72) Inventors: Toshiharu Kageyama, Ritto (JP); Satoru Kamigaito, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 189 days.

(21) Appl. No.: 17/007,027

(22) Filed: Aug. 31, 2020

(65) Prior Publication Data

US 2021/0080314 A1 Mar. 18, 2021

(30) Foreign Application Priority Data

Sep. 12, 2019 (JP) .............................. JP2019-166371

(51) Int. Cl.
*G01G 13/02* (2006.01)
*B65G 27/32* (2006.01)
(Continued)

(52) U.S. Cl.
CPC ........... *G01G 13/026* (2013.01); *B65G 27/32* (2013.01); *B65G 33/36* (2013.01); *G01G 13/248* (2013.01); *G01G 19/393* (2013.01)

(58) Field of Classification Search
CPC .. G01G 19/387; G01G 19/393; G01G 13/026; G01G 13/248; B65G 27/32; B65G 33/36
See application file for complete search history.

(56) References Cited

U.S. PATENT DOCUMENTS 4,534,428 A * 8/1985 Mosher ................ G01G 19/393
177/1
4,780,830 A * 10/1988 Omi ..................... G01G 19/393
700/219
(Continued)

FOREIGN PATENT DOCUMENTS

CN        102424122 A      4/2012
CN        102700732 A     10/2012
(Continued)

OTHER PUBLICATIONS

The extended European search report issued by the European Patent Office dated Feb. 15, 2021, which corresponds to European Patent Application No. 20193100.3-1001 and is related to U.S. Appl. No. 17/007,027.

*Primary Examiner* — Randy W Gibson
(74) *Attorney, Agent, or Firm* — Studebaker & Brackett PC

(57) ABSTRACT

A combination weighing device includes a conveying unit configured to convey articles, a controller configured to perform combination weighing of the articles, and an interface configured to receive an input of information from an operator. The controller has a first operation mode including a first control parameter that defines a conveying operation of the conveying unit and is automatically set in the device, and a second operation mode including a second control parameter that defines the conveying operation of the conveying unit and is set based on the information input from the interface, and when the interface receives an input of the information during an operation of the conveying unit in the first operation mode, the controller makes a transition from the first operation mode to the second operation mode, and controls the operation of the conveying unit using the second control parameter.

7 Claims, 3 Drawing Sheets

(51) Int. Cl.
    *B65G 33/36*     (2006.01)
    *G01G 19/393*     (2006.01)
    *G01G 13/24*     (2006.01)

(56) References Cited

U.S. PATENT DOCUMENTS

| | | | | | |
|---|---|---|---|---|---|
| 4,967,383 | A | * | 10/1990 | Hirano | G01G 19/393 177/25.15 |
| 2001/0020553 | A1 | * | 9/2001 | Tamai | G01G 19/393 177/25.18 |

FOREIGN PATENT DOCUMENTS

| | | | |
|---|---|---|---|
| CN | 103534171 | A | 1/2014 |
| EP | 1 424 542 | A1 | 6/2004 |
| EP | 2 827 115 | A1 | 1/2015 |
| EP | 3 258 227 | A1 | 12/2017 |
| JP | 4245909 | B2 | 4/2009 |
| JP | 6412174 | B2 | 10/2018 |
| WO | 2016/129635 | A1 | 8/2016 |

\* cited by examiner

COMBINATION WEIGHING DEVICE FOR CONTROLLING A CONVEYING UNIT

CROSS REFERENCE TO RELATED APPLICATIONS

This application claims the benefit of priority from Japanese Application No. JP2019-166371 filed on Sep. 12, 2019, the entire contents of which are incorporated herein by references.

TECHNICAL FIELD

The present disclosure relates to a combination weighing device.

BACKGROUND

For example, a combination weighing device includes conveying units that conveys articles, hoppers that temporarily stores the articles and are provided to correspond to the conveying units, a weighing unit that outputs a weighing value according to the mass of the articles stored in each of the hoppers, and a controller that selects a combination of weighing values from a plurality of weighing values output by the weighing unit so that a total value becomes a target weighing value and causes a hopper corresponding to the combination to discharge the articles.

For example, Japanese Patent No. 4245909 discloses a combination weighing device including conveying amount measuring means that measures a conveying amount of an object to be weighed (articles) conveyed by conveying means (conveying unit) for each conveying means, and conveying amount control means that controls the conveying amount of the object to be weighed for each conveying means based on a predetermined parameter. In Japanese Patent No. 4245909, the predetermined parameter is calculated based on calculation results of an average value and a standard deviation of the conveying amounts of the objects to be weighed. The average value and the standard deviation of the conveying amounts of the objects to be weighed are calculated based on the conveying amounts of the objects to be weighed measured a predetermined number of times by the conveying amount measuring means.

In the combination weighing device, a learning parameter automatically set by learning may be used as a parameter for controlling the conveying amount of the conveying unit. This learning parameter is updated based on accumulated various information.

SUMMARY

When the conveying amount of the conveying unit is controlled using the learning parameter or the like, as described above, the conveying amount may become an undesired amount (abnormal state) due to a change or the like in the device. For example, when the conveying unit is replaced, when a detector that detects articles staying on the conveying unit is replaced and the like, control of the conveying unit automatically set based on various information accumulated before the change of the device may be in an abnormal state immediately after the change of the device. In this case, since it is necessary to manually adjust the conveying amount of the conveying unit after the automatic control of the conveying unit is temporarily suspended, it takes time to adjust from the abnormal state to a normal state.

An object of an aspect of the present disclosure is to provide a combination weighing device in which control of a conveying unit using a control parameter automatically set in the device can be immediately adjusted to a normal state when the control of the conveying unit becomes abnormal.

A combination weighing device according to an aspect of the present disclosure includes a conveying unit configured to convey articles supplied from an outside, a controller configured to perform combination weighing of the articles conveyed by the conveying unit, and an interface configured to receive an input of information from an operator, in which the controller has a first operation mode including a first control parameter that defines a conveying operation of the conveying unit and is automatically set in the device, and a second operation mode including a second control parameter that defines the conveying operation of the conveying unit and is set based on the information input from the interface, and when the interface receives an input of the information during an operation of the conveying unit in the first operation mode, the controller makes a transition from the first operation mode to the second operation mode, and controls the operation of the conveying unit using the second control parameter.

According to this combination weighing device, when the interface receives an input of the information during an operation of the conveying unit in the first operation mode, the controller makes a transition from the first operation mode to the second operation mode, and controls the operation of the conveying unit using the second control parameter. For example, when the operation of the conveying unit in the first operation mode becomes abnormal due to a change in the device such as replacement of the conveying unit, the operator can set the second control parameter via the interface during the operation of the conveying unit in the first operation mode. In this way, it is possible to make a transition from the first operation mode to the second operation mode while the operation of the combination weighing device is continued. Therefore, in the combination weighing device, when the control of the conveying unit using the first control parameter automatically set in the device becomes abnormal, the control of the conveying unit can be immediately adjusted to the normal state.

In an aspect of the present disclosure, in the case of making the transition from the first operation mode to the second operation mode, the controller may switch from a first state to a second state at a stage when the second control parameter is set, in the first state, the first control parameter is continuously used to control the operation of the conveying unit, and in the second state, the second control parameter is continuously used to control the operation of the conveying unit.

In an aspect of the present disclosure, the first control parameter may be automatically set in both the first operation mode and the second operation mode, and when the operation of the conveying unit is controlled using the second control parameter, the controller may make a transition from the second operation mode to the first operation mode and control the operation of the conveying unit using the first control parameter at a stage when a difference between an average value of the second control parameter and an average value of the first control parameter is within a predetermined range. In this case, it is possible to make a transition to the control of the conveying unit using the first control parameter before the control of the conveying unit using the second control parameter becomes abnormal.

Therefore, the period during which the control of the conveying unit is in the normal state can be maintained for a long period of time.

In an aspect of the present disclosure, the conveying unit may include a member configured to convey the articles by a vibration operation, each of the first control parameter and the second control parameter may include at least one of a conveying strength and a conveying time in the vibration operation, and the controller may be configured to use an average value of at least one of the conveying strength and the conveying time of the conveying unit included in the first control parameter, and an average value of at least one of the conveying strength and the conveying time of the conveying unit set by the second control parameter.

In an aspect of the present disclosure, the conveying unit may include a member configured to convey the articles by a rotation operation, each of the first control parameter and the second control parameter may include at least one of a rotation speed and a rotation time in the rotation operation, and the controller may be configured to use an average value of at least one of the rotation speed and the rotation time of the conveying unit included in the first control parameter, and an average value of at least one of the rotation speed and the rotation time of the conveying unit set by the second control parameter.

According to an aspect of the present disclosure, it is possible to provide a combination weighing device in which control of a conveying unit using a control parameter automatically set in the device can be immediately adjusted to a normal state when the control of the conveying unit becomes abnormal.

DETAILED DESCRIPTION

Hereinafter, an embodiment of the present disclosure will be described in detail with reference to the drawings. Incidentally, in the respective drawings, the same or a corresponding part is denoted by the same reference symbol, and duplicate description is omitted.

Figure 1:
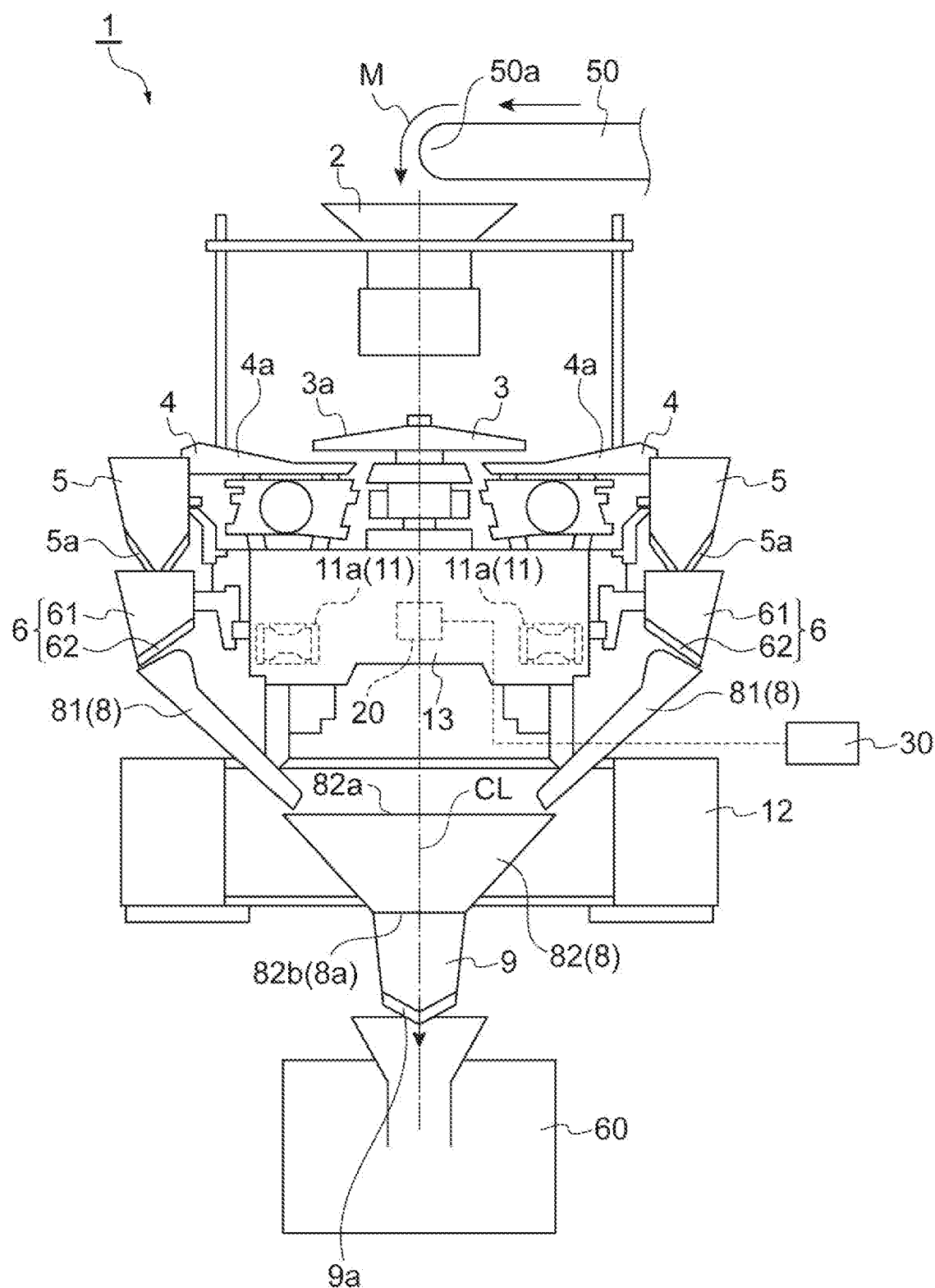
FIG. 1 is a schematic configuration diagram of a combination weighing device according to an embodiment.

FIG. 1 is a schematic configuration diagram of a combination weighing device according to the present embodiment. As illustrated in FIG. 1, a combination weighing device 1 includes a charge chute 2, a dispersion feeder 3 (conveying unit 40), a plurality of radiation feeders 4 (conveying unit 40), a plurality of pool hoppers 5, a plurality of weighing hoppers 6, a collecting chute 8, a timing hopper 9, a weighing unit 11, a controller 20, and an interface 30. The combination weighing device 1 weighs articles M (articles having variations in unit mass such as agricultural products, fishery products, and processed foods) supplied by a conveyance conveyor 50 such that the articles correspond to a target weighing value, and supplies the articles to a bag forming and packaging machine 60. The bag forming and packaging machine 60 packages the articles M weighed and supplied by the combination weighing device 1 while forming a film into a bag of a predetermined capacity. In addition, the conveyance conveyor 50 is an external device that supplies the articles M to the combination weighing device 1.

The charge chute 2 is disposed below a conveying end 50a of the conveyance conveyor 50. The charge chute 2 receives the articles M dropping from the conveying end 50a of the conveyance conveyor 50, and discharges the articles M downward.

The dispersion feeder 3 is a part of the conveying unit 40 that conveys the articles M supplied from the outside and is a member disposed below the charge chute 2. The dispersion feeder 3 has a conical conveying surface 3a that widens downward toward an end. The dispersion feeder 3 conveys the articles M by a vibration operation. For example, the dispersion feeder 3 vibrates the conveying surface 3a to uniformly convey the articles NI discharged from the charge chute 2 to a top of the conveying surface 3a toward an outer edge of the conveying surface 3a. The vibration intensity or the like of the dispersion feeder 3 may be controlled automatically or manually.

The plurality of radiation feeders 4 is another part of the conveying unit 40 and is a member that further conveys the articles M conveyed from the dispersion feeder 3. The plurality of radiation feeders 4 is radially arranged along the outer edge of the conveying surface 3a of the dispersion feeder 3, Each of the radiation feeders 4 has a trough 4a extending outward from below the outer edge of the conveying surface 3a. Each radiation feeder 4 conveys the articles NI by a vibration operation. For example, the radiation feeder 4 conveys the articles M discharged from the outer edge of the conveying surface 3a toward a distal end of the trough 4a by vibrating the trough 4a. The vibration intensity or the like of the radiation feeder 4 may be controlled automatically or manually.

The plurality of pool hoppers 5 is disposed to surround a center line CL parallel to a vertical direction. Each of the pool hoppers 5 is disposed below the distal end of the trough 4a of each radiation feeder 4. Each pool hopper 5 has a gate 5a allowed to be opened and closed. The gate 5a is provided at a bottom of the pool hopper 5, Each pool hopper 5 temporarily stores the articles M discharged from the distal end of the corresponding trough 4a by closing the gate 5a. Further, each pool hopper 5 discharges the temporarily stored articles M downward by opening the gate 5a.

The plurality of weighing hoppers 6 is disposed to surround the center line CL. Each of the weighing hoppers 6 is disposed below the gate 5a of each pool hopper 5. Each weighing hopper 6 has a main body 6a and a gate 6b allowed to be opened and closed. The gate 6b is provided on the main body 6a. Each weighing hopper 6 temporarily stores the articles M discharged from the corresponding pool hopper 5 in the main body 6a by closing the gate 6b. Further, each weighing hopper 6 discharges the temporarily stored articles M in the main body 6a downward by opening the gate 6b.

The collecting chute 8 collects the articles M discharged from each weighing hopper 6 into a discharge port 8a. The discharge port 8a is located below the plurality of weighing hoppers 6 and on the center line CL. The collecting chute 8 has an upper chute part 81 and a lower chute part 82. The upper chute part 81 receives the articles M discharged from each weighing hopper 6 and slides the articles M toward the discharge port 8a side (that is, the center line CL side and the lower side). The lower chute part 82 is a truncated cone-shaped cylindrical body that tapers downward, and has an upper opening 82a and a lower opening 82b. The lower chute part 82 uses the lower opening 82b as the discharge port 8a and discharges the articles M downward from the discharge port 8a.

The timing hopper 9 is disposed below the discharge port 8a. The timing hopper 9 has a gate 9a allowed to be opened and closed with respect to a bottom thereof. The timing hopper 9 temporarily stores the articles M discharged from the collecting chute 8 by closing the gate 9a. Further, the timing hopper 9 discharges the temporarily stored articles M to the bag forming and packaging machine 60 by opening the gate 9a.

The weighing unit 11 is disposed in a case 13 supported on a frame 12. The weighing unit 11 has a plurality of load cells 11a. Each of the load cells 11a supports the corresponding weighing hopper 6. When the articles M are temporarily stored in each weighing hopper 6, the weighing unit 11 weighs a weighing value according to the mass of the articles M.

The controller 20 is disposed in the case 13. The controller 20 includes a central processing unit (CPU), a read only memory (ROM), a random access memory (RAM) or the like. The controller 20 controls an operation of each part of the combination weighing device 1 such as a conveying operation of the conveying unit 40 (the dispersion feeder 3 and the radiation feeders 4), an opening/closing operation of the gate 5a of each pool hopper 5, an opening/closing operation of the gate 6b of each weighing hopper 6, or an opening closing operation of the gate 9a of the timing hopper 9.

The controller 20 stores the weighing value weighed by the weighing unit 11 and the weighing hopper 6 that stores the articles M corresponding to the weighing value in association with each other. The controller 20 selects a combination of weighing values from weighting values weighed by the weighing unit 11 and associated with the respective weighing hoppers 6 so that a total value becomes a target weighing value. More specifically, the controller 20 selects a combination of weighing values from weighting values output by the weighing unit 11 so that a total value falls within a predetermined range whose lower limit corresponds to the target weighing value. That is, the controller 20 performs combination weighing of the articles M conveyed to the combination weighing device 1. Then, the controller 20 causes the weighing hopper(s) 6 associated with the combination to discharge the articles M.

The interface 30 is a device that receives input of information from a user (operator). The information received via the interface 30 is, for example, information for controlling the conveying operation of the conveying unit 40 (at least one of the dispersion feeder 3 and the radiation feeder 4), and is transmitted to the controller 20. The information for controlling the conveying operation of the conveying unit 40 is, for example, information related to a conveying strength of the conveying unit 40, information related to a conveying time or the like. When the conveying unit 40 vibrates, the conveying strength of the conveying unit 40 corresponds to the amplitude of the vibration of the conveying unit 40, and the conveying time of the conveying unit 40 corresponds to the number of vibrations of the conveying unit 40 per unit time. In the present embodiment, the interface 30 is provided at a position separated from the frame 12 and the case 13, and not limited thereto. For example, the interface 30 is a touch panel provided on a display unit such as a liquid crystal display; and not limited thereto. The interface 30 may include a keyboard, a mouse, a numeric keypad, a microphone or the like. The interface 30 may have a speaker or the like that outputs sound.

The charge chute 2, the dispersion feeder 3, the plurality of radiation feeders 4, the plurality of pool hoppers 5, and the plurality of weighing hoppers 6 are directly or indirectly supported by the case 13. The collecting chute 8 and the timing hopper 9 are directly or indirectly supported by the frame 12.

Figure 2:
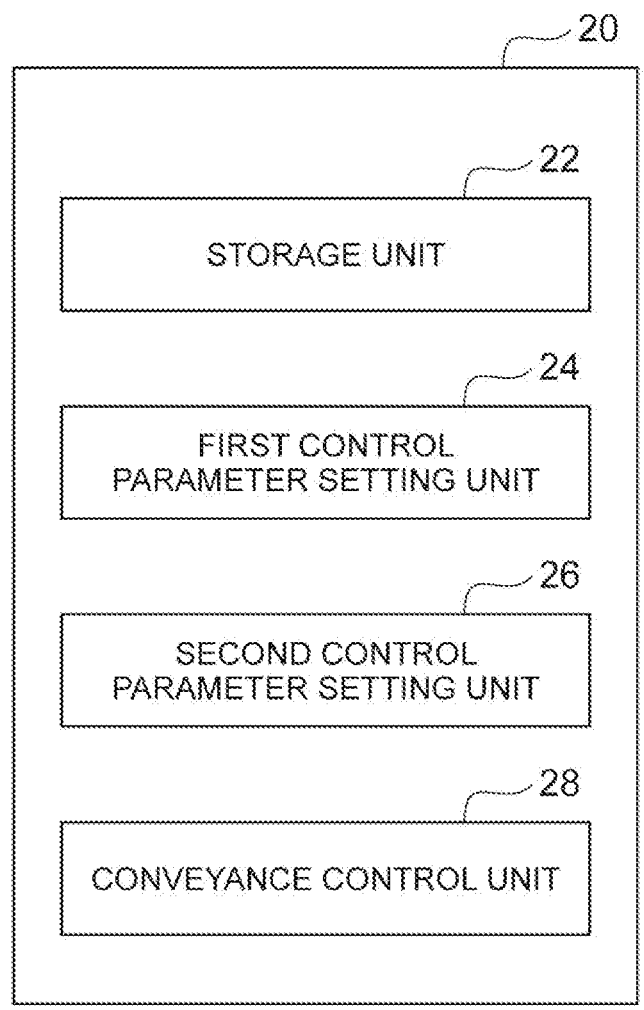
FIG. 2 is a diagram illustrating a functional configuration of a controller.

Next, the controller 20 will be described in more detail. FIG. 2 is a diagram illustrating a functional configuration of the controller. As illustrated in FIG. 2, the controller 20 includes a storage unit 22, a first control parameter setting unit 24, a second control parameter setting unit 26, and a conveyance control unit 28. The controller 20 has the storage unit 22, the first control parameter setting unit 24, the second control parameter setting unit 26, and the conveyance control unit 28 as conceptual parts for executing various control processes. For example, such conceptual parts are configured as software in which a program stored in the ROM is loaded on the RAM and executed by the CPU.

The storage unit 22 stores information related to the operation of the combination weighing device 1. For example, the storage unit 22 stores an operation mode of the conveying unit 40. In the present embodiment, the operation mode has a first operation mode including a first control parameter automatically set in the device and a second operation mode including a second control parameter set based on information input from the interface 30. Each of the first control parameter and the second control parameter is a parameter that defines the conveying operation of the conveying unit 40. For example, the first control parameter is automatically set using accumulation of a relationship between a parameter set in the past in the combination weighing device 1 and a control result using the parameter. That is, the first control parameter is automatically set based on a learning function of the combination weighing device 1. The second control parameter is set based on externally input information that controls the conveying operation of the conveying unit 40. Each of the first control parameter and the second control parameter includes, for example, at least one of the conveying strength and the conveying time in the vibration operation of the conveying unit 40.

The first control parameter setting unit 24 sets the first control parameter based on information related to an operation of the combination weighing device 1 accumulated in the storage unit 22. That is, the first control parameter setting unit 24 performs the learning function of the combination weighing device 1. The first control parameter setting unit 24 updates the first control parameter as needed or periodically. In this way, the control accuracy of the conveying operation of the conveying unit 40 in the first operation mode can be improved. In the present embodiment, the first control parameter setting unit 24 updates the first control parameter even when the operation of the conveying unit 40 is controlled using the second control parameter. That is, the first control parameter is automatically set in both the first operation mode and the second operation mode. The first control parameter setting unit 24 transmits the set first control parameter to the storage unit 22 and the conveyance control unit 28.

A description will be given of an example of the first control parameter obtained using the storage unit 22 and the first control parameter setting unit 24. Hereinafter, a description will be given of an example of a method of setting the conveying strength of the radiation feeder 4 included in the first control parameter. For example, the storage unit 22 stores a relationship among a layer thickness S of the articles M on the radiation feeder 4, a target conveying amount W of the radiation feeder 4, a feed force P of the radiation feeder 4, and an operation time t of the radiation feeder 4. The operation time t is a duration during which the radiation feeder 4 is actually operating to convey the articles. Specifically, Equation (1) below is stored in the storage unit 22. The storage unit 22 stores the above relationship for each of the plurality of radiation feeders 4. The storage unit 22 stores a derivation result of the following Equation (1).

$$P = A \times W/S + B \quad (1)$$

The feed force P is the amplitude of vibration (conveying strength) of the radiation feeder 4. When a value of the feed force P is small, the amplitude of the radiation feeder 4 decreases. For this reason, a conveying amount of the articles M supplied from the radiation feeder 4 to the weighing hopper 6 (the pool hopper 5) decreases. When the value of the feed three P is large, the amplitude of the radiation feeder 4 increases. For this reason, the conveying amount of the articles M supplied from the radiation feeder 4 to the weighing hopper 6 increases. The target conveying amount W is the amount of the articles M supplied from the radiation feeder 4 to the weighing hopper 6 through the pool hopper 5.

Figure 3:
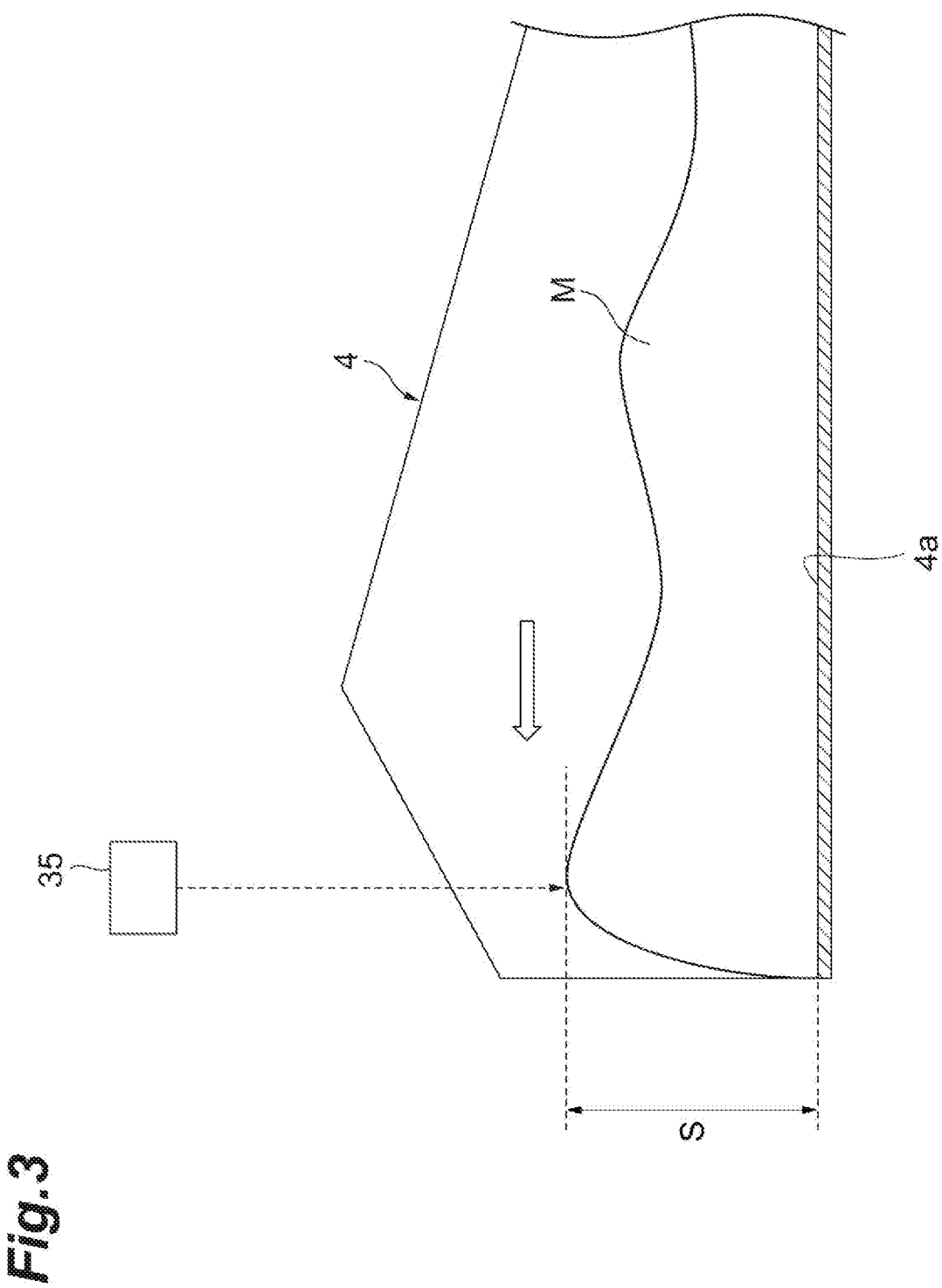
FIG. 3 is a diagram illustrating a part around a discharge end of a radiation feeder.

As illustrated in FIG. 3, the layer thickness S is a distance between a bottom surface 4s of the radiation feeder 4 and a top portion of the articles M around a discharge end of the radiation feeder 4. The layer thickness S is acquired based on a detection result of a detecting unit 35. The detecting unit 35 is disposed above each radiation feeder 4 to correspond to each radiation feeder 4. The detecting unit 35 is attached to a support frame (not illustrated) and positioned above the radiation feeder 4.

The detecting unit 35 detects a distance between the detecting unit 35 and the articles on the radiation feeder 4. For example, the detecting unit 35 obtains the distance between the detecting unit 35 and the articles by irradiating the article with light and receiving light reflected by the articles. In the present embodiment, the detecting unit 35 is a distance measuring sensor. As illustrated in FIG. 3, the detecting unit 35 detects a distance to the articles located around the discharge end of the radiation feeder 4. A position around the discharge end refers to a position shifted backward from a distal end of the radiation feeder 4 in a conveying direction by a predetermined distance. For example, the position around the discharge end is a position shifted backward from the distal end of the radiation feeder 4 by about 30 mm to 50 mm. The detecting unit 35 transmits a detection signal indicating the detected distance to the articles to the controller 20.

In the above description, a configuration in which the combination weighing device 1 has the detecting unit 35 for detecting the layer thickness S has been described. However, the detecting unit 35 may be configured as an external device different from the combination weighing device 1. In this case, the combination weighing device 1 simply acquires information related to the layer thickness S from this external device. That is, the detecting unit 35 may not be an indispensable configuration. As a result, any configuration may be adopted as long as the combination weighing device 1 acquires the information related to the layer thickness S.

In the above Equation (1), each of "A" and "B" corresponds to a coefficient. The coefficient A and the coefficient B are parameters related to an operation of the conveying unit 40, and are used when determining the current or future feed force P. The coefficient A and the coefficient B are parameters for linking a relationship between the feed force P and a value obtained based on the layer thickness S of the articles M and on the target conveying amount W Referring to the coefficient A and the coefficient B, in an initial state of the combination weighing device 1 (when work of the combination weighing device 1 is started for the first time), for example, a value empirically obtained according to the configuration of the combination weighing device 1 is given as an initial value (initial parameter). Each of the coefficient A and the coefficient B is a value that can be changed depending on the shape of the radiation feeder 4 and/or the type of the articles.

The first control parameter setting unit 24 successively calculates the coefficient A and the coefficient B based on a relationship among the layer thickness S, the target conveying amount W, and the feed force P continuously acquired from the past. That is, the first control parameter setting unit 24 calculates the coefficient A and the coefficient B by learning control. The first control parameter setting unit 24 derives the new coefficient A and coefficient B by, for example, the least square method based on history information acquired so far. Further, when the new coefficient A and coefficient B are derived, the weight (the magnitude of an influence in determining the new coefficient A and coefficient B) can be set for each piece of history information. For example, the weight is high for information close to a current time.

The first control parameter setting unit 24 calculates the feed force P of each radiation feeder 4 using the calculated coefficients A and B and the above Equation (1). The calculated feed force P is transmitted to the conveyance control unit 28.

Returning to FIG. 2, the second control parameter setting unit 26 sets the second control parameter based on information input from the interface 30, The second control parameter setting unit 26 transmits the set second control parameter to the storage unit 22 and the conveyance control unit 28. Every time the second control parameter is transmitted to the storage unit 22, the second control parameter stored in the storage unit 22 is overwritten. The second control parameter is not automatically updated and is manually updated.

The conveyance control unit 28 controls the conveying operation of the conveying unit 40 according to the operation mode stored in the storage unit 22. For example, the conveyance control unit 28 controls the conveying operation of the conveying unit 40 according to the first operation mode including the first control parameter transmitted from the first control parameter setting unit 24 or to the second operation mode including the second control parameter transmitted from the second control parameter setting unit 26. In the first operation mode, the conveyance control unit 28 continuously uses the first control parameter. In the second operation mode, the conveyance control unit 28 continuously uses the second control parameter.

When the second control parameter is not set, the conveyance control unit 28 controls the conveying operation of the conveying unit 40 by continuously using the first control parameter in the first operation mode. On the other hand, when the second control parameter is set, the conveyance control unit 28 controls the conveying operation of the conveying unit 40 by continuously using the second control parameter in the second operation mode. For example, when the interface 30 receives an input of information during the operation of the conveying unit 40 in the first operation mode, the conveyance control unit 28 makes a transition from the first operation mode to the second operation mode and controls the operation of the conveying unit 40 using the second control parameter. In this case, from when the conveying strength or the like of the conveying unit 40 is to be manually set, the automatic control of the conveying operation of the conveying unit 40 is suspended and the manual control of the conveying operation of the conveying unit 40 is prioritized. In this way; the conveyance control unit 28 can control the operation of the conveying unit 40 without suspending the operation of the conveying unit 40.

In the case of making a transition from the first operation mode to the second operation mode, the conveyance control unit 28 may control the operation of the conveying unit 40 by switching from a state in which the first control parameter is continuously used to a state in which the second control parameter is continuously used at a stage when the second control parameter is set. In other words, the conveyance control unit 28 may control the operation of the conveying unit 40 in the first operation mode until the second control parameter is set, and control the operation of the conveying unit 40 in the second operation mode after the second control parameter is set. In this case, the conveyance control unit 28 can control the operation of the conveying unit 40 without suspending the operation of the conveying unit 40.

When a preset condition (predetermined condition) is satisfied during the control of the conveying operation of the conveying unit 40 in the second operation mode, the conveyance control unit 28 makes a transition from the second operation mode to the first operation mode. In this case, the conveyance control unit 28 controls the operation of the conveying unit 40 by switching from the state in which the second control parameter is continuously used to the state in which the first control parameter is continuously used. In other words, for example, the conveyance control unit 28 controls the operation of the conveying unit 40 in the second operation mode until a predetermined condition is satisfied, and controls the operation of the conveying unit 40 in the first operation mode after the predetermined condition is satisfied. Also in this case, the conveyance control unit 28 can control the operation of the conveying unit 40 without suspending the operation of the conveying unit 40. For example, the conveyance control unit 28 determines whether or not the above-described predetermined condition is satisfied, at all time or periodically.

For example, the predetermined condition is set based on an average value of the first control parameter and an average value of the second control parameter. In this case, the conveyance control unit 28 uses the average value of the first control parameter and the average value of the second control parameter to determine whether or not the predetermined condition is satisfied. That is, the conveyance control unit 28 determines whether or not to make a transition from the second operation mode to the first operation mode. For example, when a difference between the average value of the second control parameter and the average value of the first control parameter becomes within a predetermined range while the conveying operation of the conveying unit 40 is being controlled in the second operation mode, the transition from the second operation mode to the first operation mode is made. In other words, when the difference between the average value of the second control parameter and the average value of the first control parameter is outside the predetermined range while the conveying operation of the conveying unit 40 is controlled in the second operation mode, the control of the conveying operation of the conveying unit 40 in the second operation mode is continued.

Each of the average value of the first control parameter and the average value of the second control parameter is, for example, an average value of at least one of the conveying strength and the conveying time of the conveying unit 40. As a specific example, each of the average value of the first control parameter and the average value of the second control parameter is an average value of at least one of the conveying strength and the conveying time in each radiation feeder 4. The average value of the conveying strength included in the first control parameter indicates the average value of the conveying strength of each radiation feeder 4, and the average value of the conveying time included in the first control parameter indicates the average value of the conveying time of each radiation feeder 4. The predetermined range is appropriately adjusted depending on the type of the articles to be weighed or the like. For example, when a difference (absolute value) between the average value of the conveying strength included in the first control parameter and the average value of the conveying strength included in the second control parameter is, for example, 15 or less, a transition from the second operation mode to the first operation mode is made.

Upon the transition from the first operation mode to the second operation mode, the conveyance control unit 28 may reset the operation time t stored in the storage unit 22. In this case, for example, a relationship among the layer thickness S of the articles M on the radiation feeders 4, the target conveying amount W of the radiation feeders 4, the feed force P of the radiation feeders 4, and the operation time t of the radiation feeders 4 is reset. In this way, the first control parameter setting unit 24 can update the first control parameter without history information before the transition of the second operation mode. Therefore, it is possible to shorten a period until switching from the second operation mode to the first operation mode.

According to the combination weighing device 1 according to the present embodiment described above, when the interface 30 receives input of information during the operation of the conveying unit 40 in the first operation mode, the controller 20 makes a transition from the first operation mode to the second operation mode, and controls the operation of the conveying unit 40 using the second control parameter. For example, when the operation of the conveying unit 40 in the first operation mode becomes abnormal due to a change in the device such as replacement of the conveying unit 40, the operator can set the second control parameter via the interface during the operation of the conveying unit 40 in the first operation mode. In this way, it is possible to make a transition from the first operation mode to the second operation mode while the operation of the combination weighing device 1 is continued. Therefore, in the combination weighing device 1, when the control of the conveying unit 40 using the first control parameter automatically set in the device becomes abnormal, the control of the conveying unit 40 can be immediately adjusted to the normal state.

In the present embodiment, in the case of the transition from the first operation mode to the second operation mode; the controller 20 may switch from the state in which the first control parameter is continuously used to the state in which the second control parameter is continuously used to control the operation of the conveying unit 40 at a stage when the second control parameter is set. In this case, it is possible to make a transition from the first operation mode to the second operation mode while the operation of the combination weighing device 1 is reliably continued.

In the present embodiment, the first control parameter may be automatically set in both the first operation mode and the second operation mode, and in the case of controlling the operation of the conveying unit 40 using the second control parameter, the controller 20 may make a transition from the second operation mode to the first operation mode and control the operation of the conveying unit 40 using the first control parameter at a stage when a difference between the average value of the second control parameter and the average value of the first control parameter is within a predetermined range. When the second control parameter is set once, the second control parameter remains unchanged until manually updated. For this reason, when the operation time of the combination weighing device 1 using the second operation mode continues, the control of the conveying unit 40 using the second control parameter may become in an abnormal state. On the other hand, in the present embodiment, as described above, at a stage when the difference between the average value of the second control parameter and the average value of the first control parameter is within the predetermined range, it is possible to make a transition from the second operation mode to the first operation mode. In this way, it is possible to make a transition to the control of the conveying unit using the first control parameter before the control of the conveying unit 40 using the second control parameter becomes abnormal. Therefore, the period during which the control of the conveying unit 40 is in the normal state can be maintained for a long period of time.

In the present embodiment, the conveying unit 40 may have a member that conveys articles by a vibration operation, each of the first control parameter and the second control parameter may include at least one of the conveying strength and the operation time in the vibration operation, and the controller 20 may use the average value of at least one of the conveying strength and the conveying time of the conveying unit 40 included in the first control parameter, and the average value of at least one of the conveying strength and the conveying time of the conveying unit 40 set by the second control parameter.

Even though one embodiment of the invention has been described above, the invention is not limited to the above embodiment. For example, the plurality of hoppers is not limited to those annularly disposed as the plurality of weighing hoppers described above, and may be disposed in a matrix. The combination weighing device may include a plurality of booster hoppers.

In the above embodiment, a description has been given of a mode in which the dispersion feeder and the plurality of radiation feeders included in the conveying unit convey the article by vibration, however, it is not limited thereto. It is sufficient that the conveying unit has a configuration capable of conveying the articles. For example, the conveying unit may have a member that conveys articles by a rotation operation. In this case, for example, the conveying unit has a coil unit (screw) that can be rotationally driven, a belt conveyor or the like, and each of the first control parameter and the second control parameter includes at least one of a rotation speed and a rotation time in the rotation operation of the conveying unit. The controller may use an average value of at least one of the rotation speed and the rotation time of the conveying unit included in the first control parameter and an average value of at least one of the rotation speed and the rotation time of the conveying unit set by the second control parameter. The rotation speed corresponds to the number of rotations per unit time and is, for example, revolutions per minute (rpm) of the coil unit, the number of rotations of a roller that drives the belt conveyor or the like. The rotation time is a time during which the roller intermittently operates according to a set value. For example, the roller operates during a time that is a multiple of 20 ms with respect to the set value.

In the above embodiment, the first control parameter is automatically set based on the learning function of the combination weighing device. However, the first control parameter is not limited thereto. The first control parameter may be automatically set without using the learning function. For example, the first control parameter may be automatically set using the amount of articles in the weighing hopper to be weighed by the weighing unit. Alternatively, in the above embodiment, the second control parameter may be set in the controller in advance. In this case, for example, a plurality of parameters corresponding to the second control parameter is stored in the storage unit, and the second control parameter may be set by selecting an optimum parameter based on the information input from the interface.

In the above embodiment, the combination weighing device includes the dispersion feeder, and the radiation feeders are radially disposed around the dispersion feeder; however, it is not limited thereto. For example, each of the conveying unit and the weighing unit included in the combination weighing device may be linearly disposed.

What is claimed is:

1. A combination weighing device comprising:
   a conveying unit configured to convey articles supplied from an outside;
   a controller configured to perform combination weighing of the articles conveyed by the conveying unit; and
   an interface configured to receive an input of information from an operator,
   wherein the controller has
   a first operation mode including a first control parameter that defines a conveying operation of the conveying unit, the first control parameter being automatically set in the combination weighing device, and
   a second operation mode including a second control parameter that defines the conveying operation of the conveying unit, the second control parameter being set based on the information input from the interface, and
   when the interface receives an input of the information during an operation of the conveying unit in the first operation mode, the controller operates the second operation mode with priority in place of the first operation mode, and controls the operation of the conveying unit using the second control parameter.

2. The combination weighing device according to claim 1, wherein in the case of operating the second operation mode with priority in place of the first operation mode, the controller controls the operation of the conveying unit by switching from a first state to a second state at a stage when the second control parameter is set,
   in the first state, the first control parameter is continuously used, and
   in the second state, the second control parameter is continuously used.

3. The combination weighing device according to claim 1, wherein the first control parameter is automatically set in both the first operation mode and the second operation mode, and
   when the operation of the conveying unit is controlled using the second control parameter, the controller makes a transition from the second operation mode to the first operation mode and controls the operation of the conveying unit using the first control parameter at a stage when a difference between an average value of the second control parameter and an average value of the first control parameter is within a predetermined range.

4. The combination weighing device according to claim 3, wherein the conveying unit includes a member configured to convey the articles by a vibration operation thereof, each of the first control parameter and the second control parameter includes at least one of a conveying strength and a conveying time in the vibration operation, and the controller is configured to use an average value of at least one of the conveying strength and the conveying time of the conveying unit included in the first control parameter, and an average value of at least one of the conveying strength and the conveying time of the conveying unit set by the second control parameter.

5. The combination weighing device according to claim 4, wherein the member includes at least one of a dispersion feeder and a radiation feeder.

6. The combination weighing device according to claim 3, wherein the conveying unit has a member configured to convey the articles by a rotation operation thereof, each of the first control parameter and the second control parameter includes at least one of a rotation speed and a rotation time in the rotation operation, and the controller is configured to use an average value of at least one of the rotation speed and the rotation time of the conveying unit included in the first control parameter, and an average value of at least one of the rotation speed and the rotation time of the conveying unit set by the second control parameter.

7. The combination weighing device according to claim 6, wherein the member includes at least one of a coil unit and a screw.

\* \* \* \* \*